(12) United States Patent
Nishigaki et al.

(10) Patent No.: US 7,812,723 B2
(45) Date of Patent: Oct. 12, 2010

(54) INTRUDER DETECTION SYSTEM

(75) Inventors: Syoujirou Nishigaki, Tokyo (JP); Kazuma Hirano, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 249 days.

(21) Appl. No.: 11/516,553

(22) Filed: Sep. 7, 2006

(65) Prior Publication Data
US 2007/0152817 A1 Jul. 5, 2007

(30) Foreign Application Priority Data
Dec. 28, 2005 (JP) ............................ P2005-378784

(51) Int. Cl.
*G08B 13/18* (2006.01)
*G01S 13/00* (2006.01)

(52) U.S. Cl. .......................... 340/552; 342/27; 340/561
(58) Field of Classification Search ......... 340/552–554, 340/561, 555–565; 342/27–28; 455/55; 250/342
See application file for complete search history.

(56) References Cited

U.S. PATENT DOCUMENTS

| | | | | | |
|---|---|---|---|---|---|
| 3,947,834 | A | * | 3/1976 | Gershberg et al. | 340/554 |
| 4,091,367 | A | * | 5/1978 | Harman | 340/552 |
| 4,213,123 | A | * | 7/1980 | Poirier | 340/552 |
| 4,536,752 | A | * | 8/1985 | Cheal et al. | 340/554 |
| 4,562,428 | A | * | 12/1985 | Harman et al. | 340/552 |
| 4,599,121 | A | * | 7/1986 | Edwards et al. | 156/48 |
| 4,612,536 | A | * | 9/1986 | Harman | 340/552 |
| 4,887,069 | A | * | 12/1989 | Maki et al. | 340/552 |
| 4,994,789 | A | * | 2/1991 | Harman | 340/552 |
| 5,473,336 | A | * | 12/1995 | Harman et al. | 343/790 |
| 6,288,640 | B1 | * | 9/2001 | Gagnon | 340/539.17 |
| 7,019,648 | B2 | * | 3/2006 | Gagnon | 340/552 |
| 7,075,431 | B2 | * | 7/2006 | Buckley et al. | 340/545.3 |
| 7,456,739 | B2 | * | 11/2008 | Inomata et al. | 340/552 |
| 7,522,045 | B2 | * | 4/2009 | Cutler et al. | 340/565 |

FOREIGN PATENT DOCUMENTS

| | | |
|---|---|---|
| JP | 7-029077 | 1/1995 |
| JP | 9-050585 | 2/1997 |
| JP | 9-172630 | 6/1997 |
| JP | 9-330415 | 12/1997 |

* cited by examiner

*Primary Examiner*—Benjamin C Lee
*Assistant Examiner*—Sigmund Tang
(74) *Attorney, Agent, or Firm*—Buchanan Ingersoll & Rooney PC

(57) ABSTRACT

An intruder detection system includes a leaky transmission path of a transmission side and a leaky transmission path of a receiving side, both of which has a plurality of leaky points existing in a direction to which the respective leaky transmission path extends, and the intruder detection system further includes an intrusion location detection unit which detects an intrusion location of an intruder on the basis of each signal, which is received in a receiving circuit of the receiving side, affected by the leaky electric wave at each of the leaky points. The intruder detection system further includes a detection table which associates a detectable intrusion location with a detection area, and if intrusion location detection information of the intrusion location detection unit corresponds to a detection area of the detection table, a detection result is output.

11 Claims, 19 Drawing Sheets

DETECTION TABLE                                                  521

| X 1 | Y 1 | X 2 | Y 2 | X 3 |
|---|---|---|---|---|
| DETECTION | NON-DETECTION | DETECTION | NON-DETECTION | DETECTION |

(a)

DETECTION TABLE a                    521a

| X 1 | X Y 1 1 | X 2 | X Y 1 2 | X 3 |
|---|---|---|---|---|
| DETECTION | NON-DETECTION | DETECTION | DETECTION | DETECTION |

(b)

DETECTION TABLE b                    521b

| X 1 | X Y 1 1 | X 2 | X Y 1 2 | X 3 |
|---|---|---|---|---|
| DETECTION | DETECTION | DETECTION | NON-DETECTION | DETECTION |

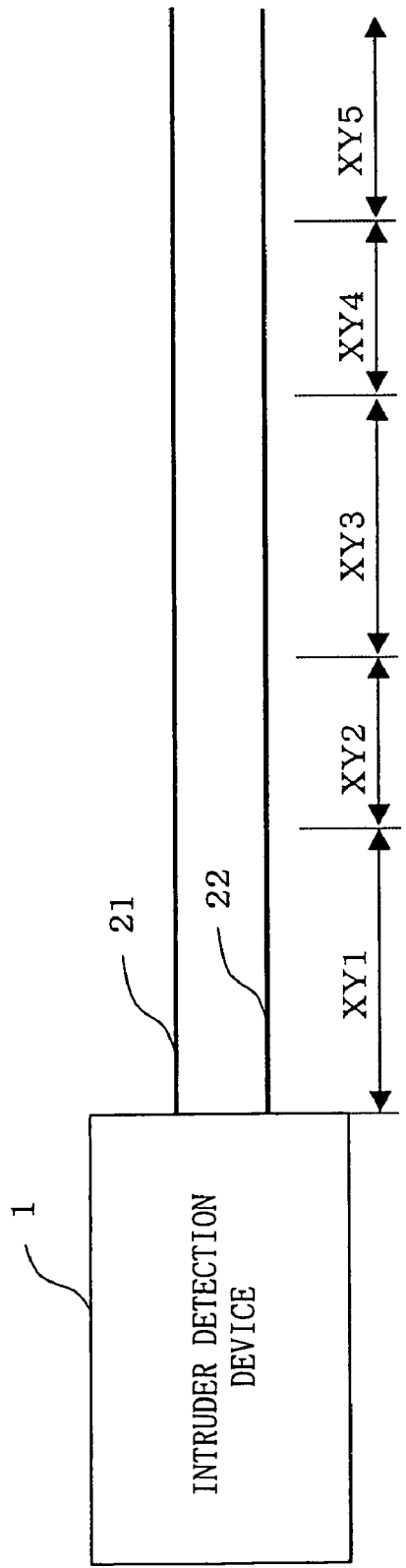

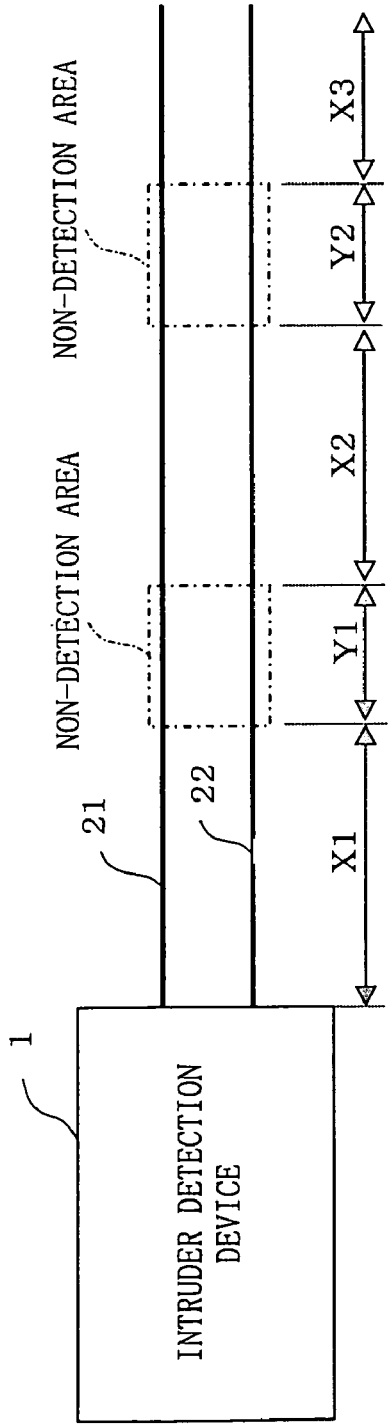

Fig.20 DETECTION TABLE

| X1 | X2 | Y1 | X3 | X4 | Y2 | X5 |
|---|---|---|---|---|---|---|
| DETECTION | DETECTION | NON-DETECTION | DETECTION | DETECTION | NON-DETECTION | DETECTION |
| → | → | → | → | → | → | → |
| CAMERA 1 | CAMERA 2 | | — | CAMERA 4 | | — |
| LIGHT 1 | LIGHT 2 | | LIGHT 3 | LIGHT 4 | | LIGHT 5 |

DETECTION TABLE

| | X1 | X2 | Y1 | X3 | X4 | Y2 | X5 |
|---|---|---|---|---|---|---|---|
| | DETECTION | DETECTION | NON-DETECTION | DETECTION | DETECTION | NON-DETECTION | DETECTION |
| | → | → | → | → | → | → | → |
| | CAMERA (LIGHT) 1 | | CAMERA (LIGHT) 2 | | CAMERA (LIGHT) 3 | | |
| | LEFT 30 DEGREE | RIGHT 30 DEGREE | | LEFT 30 DEGREE | RIGHT 30 DEGREE | | FRONT |

521g

INTRUDER DETECTION SYSTEM

BACKGROUND OF THE INVENTION

1. Field of the Invention

The present invention relates to an intruder detection system that has a leaky transmission path of a transmission side and a leaky transmission path of a receiving side, which is provided together with the leaky transmission path of the transmission side and receives a leaky electric wave from the leaky transmission path of a transmission side, and that determines that an intruder is present when an electric wave received in the leaky transmission path of the receiving side varies.

2. Description of the Related Art

In a conventional intruder detection system using a security camera disclosed in JP-A-9-172630 (FIG. 1 and the corresponding description), a plurality of security cameras should be provided so as to detect a location of an intruder.

The conventional intruder detection system having the above-described configuration should set a detection region and a detection time in accordance with a location of a security camera, a location of an image, or switching of the security camera. Further, it is difficult to precisely set the detection region and a method of setting the intruder detection system is complicated. In addition, a plurality of security cameras is necessary for detection over a long distance or for a wide detection region which has a complicated structure or configuration. Accordingly, the conventional intruder detection system is not suitable for a large-scale intrusion detection system that detects an intruder in a place such as a factory, transformer substation, or airport.

SUMMARY OF THE INVENTION

The invention has been made in consideration of the above-described problems, and it is an object of the invention to provide an intruder detection system that can easily detect whether or not an intruder is present and an intrusion location even in a large-scale intrusion detection system that detects an intruder in a place such as a factory, transformer substation, or airport.

According to an aspect of the invention, an intruder detection system includes: a leaky transmission path of a transmission side, the leaky transmission path having a plurality of leaky points existing in a direction to which the leaky transmission path extends; a leaky transmission path of a receiving side that is provided together with the leaky transmission path of the transmission side and receives a leaky electric wave from the leaky transmission path of the transmission side, the leaky transmission path having a plurality of leaky points existing in a direction to which the leaky transmission path extends; an intrusion location detection unit which detects an intrusion location of an intruder on the basis of each signal, which is received in a receiving circuit of the receiving side, affected by the leaky electric wave at each of the leaky points; and a detection table that associates a detectable intrusion location with a detection area. In the intruder detection system, it is determined that an intruder is present when an electric wave received in the leaky transmission path of the receiving side varies, and if intrusion location detection information of the intrusion location detection unit corresponds to a detection area of the detection table, a detection result is output. Accordingly, the intruder detection system can easily detect whether or not an intruder is present and an intrusion location even in a large-scale intrusion detection system that detects an intruder in a place such as a factory, transformer substation, or airport.

BRIEF DESCRIPTION OF THE DRAWINGS

FIGS. 8A and 8B are diagrams showing an example of a detection table according to the second embodiment of the invention;

FIG. 10 is a view illustrating an example of a system configuration according to a third embodiment of the invention;

FIG. 11 is a diagram showing an example of a detection table according to the third embodiment of the invention;

FIG. 16 is a view illustrating an example of a system configuration according to a fifth embodiment of the invention;

FIG. 17 is a diagram showing an example of a detection table according to the fifth embodiment of the invention;

FIG. 20 is a diagram showing an example of a detection table according to the sixth embodiment of the invention;

DESCRIPTION OF THE PREFERRED EMBODIMENTS

First Embodiment

Figure 1:
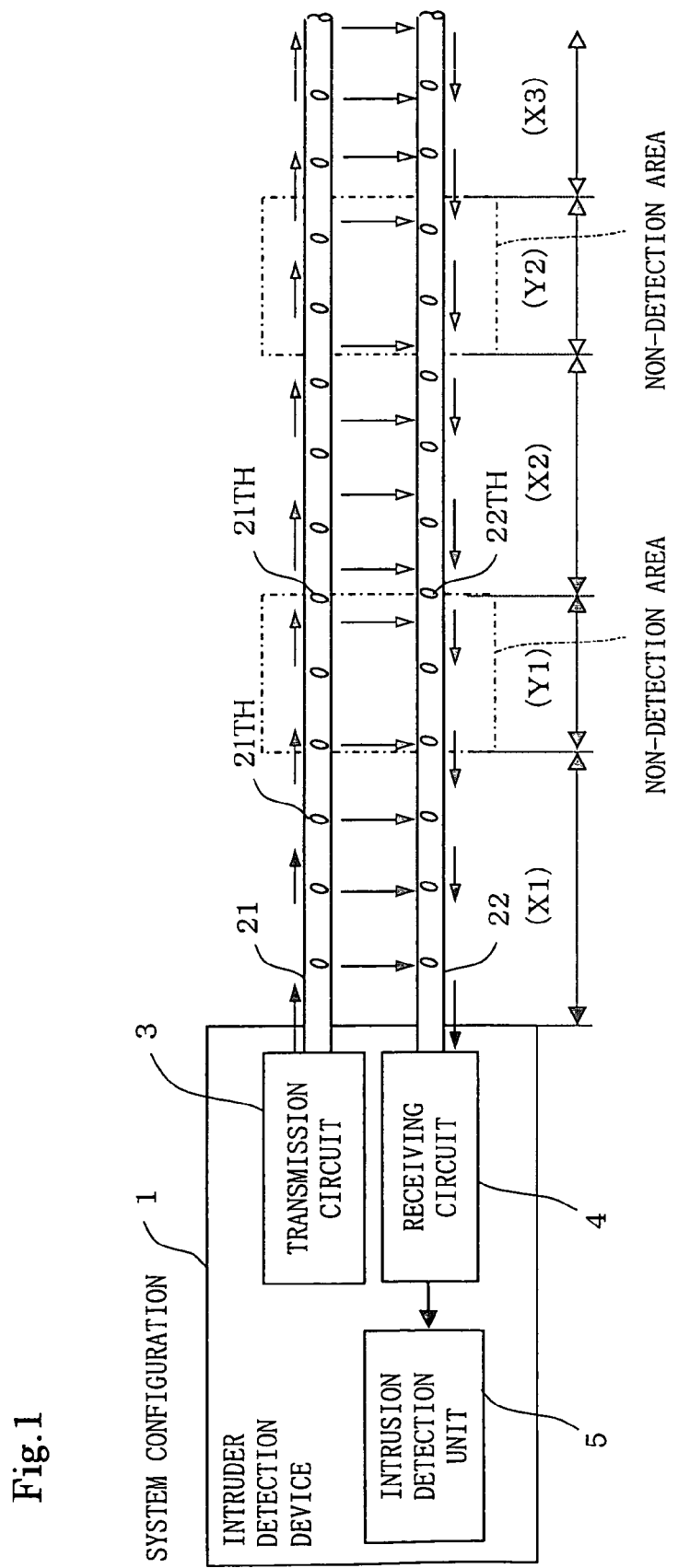
FIG. 1 is a view illustrating an example of a system configuration according to a first embodiment of the invention.
Figure 2:
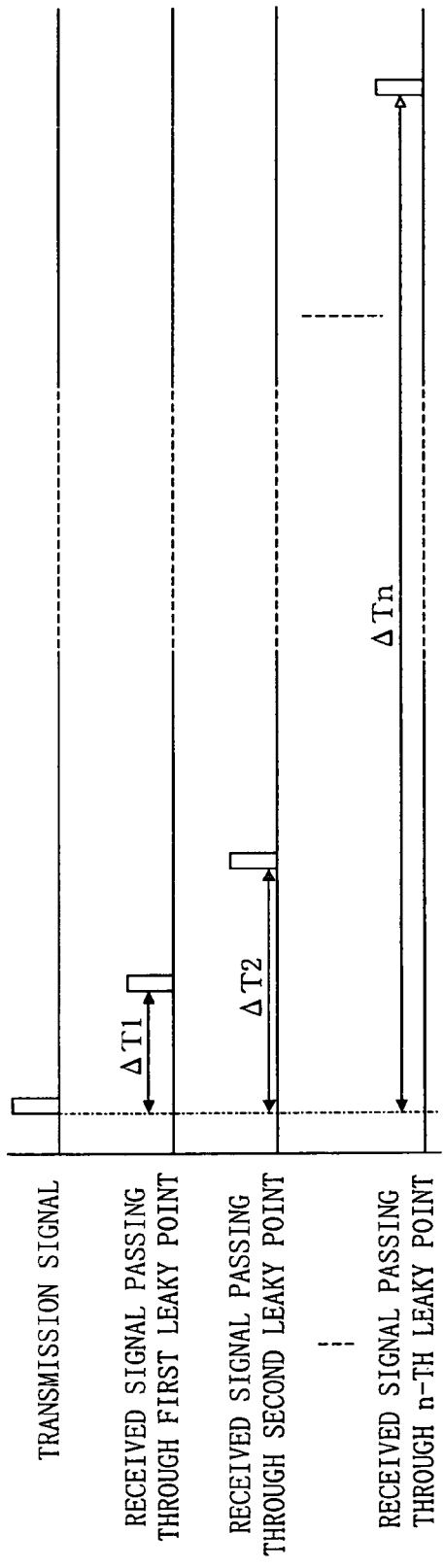
FIG. 2 is a view illustrating an example of the concept of detection for an intrusion location according to the first embodiment of the invention.
Figure 3:
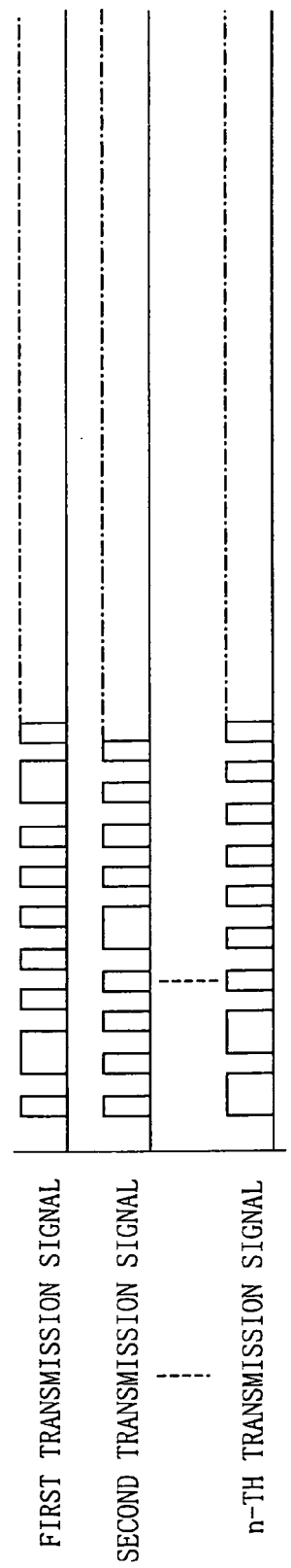
FIG. 3 is a view illustrating a specific example of a transmission signal according to the first embodiment of the invention.
Figure 4:
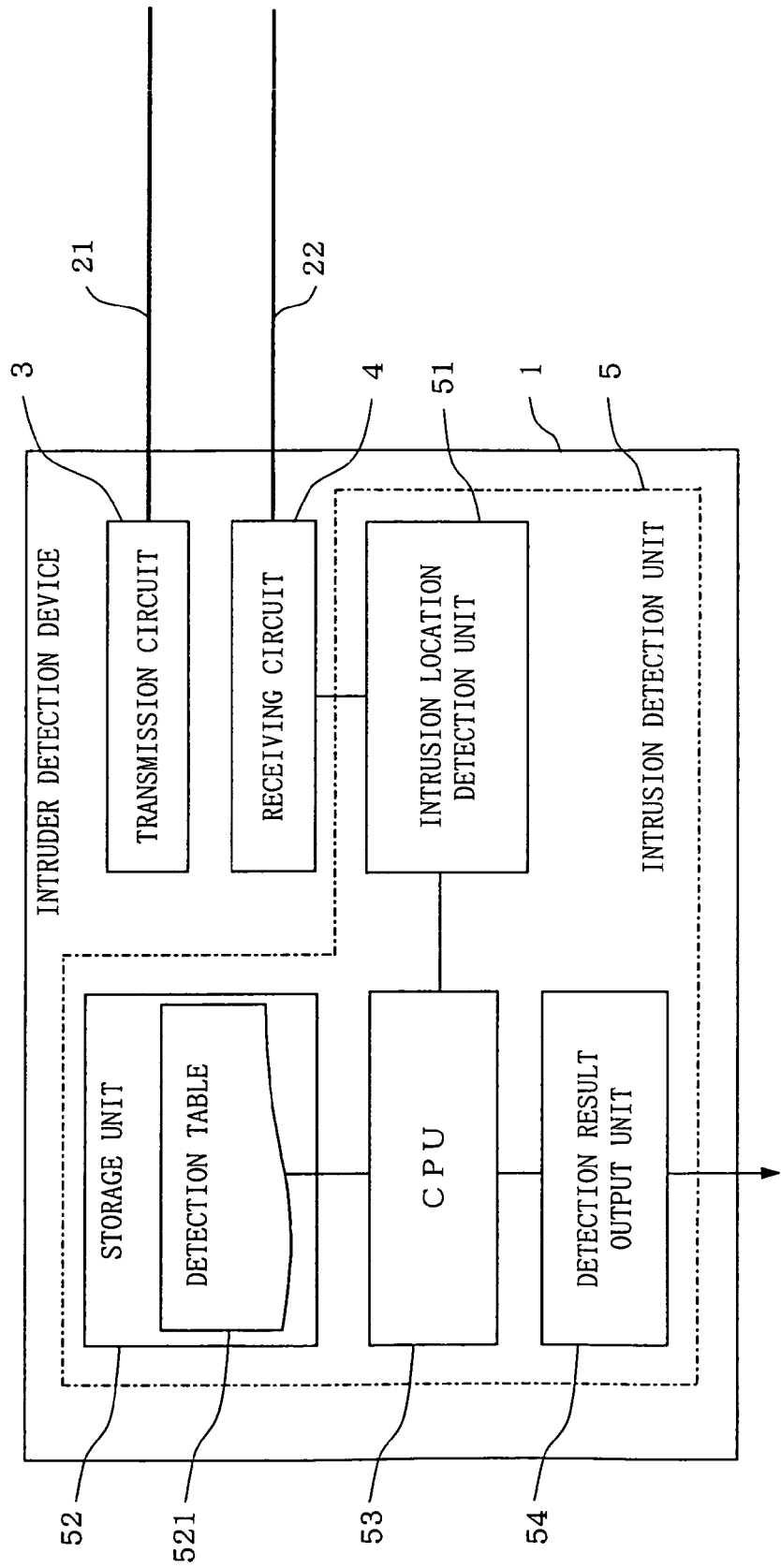
FIG. 4 is a block diagram illustrating an example of an inner configuration of an intruder detection device shown in FIG. 1 according to the first embodiment of the invention.
Figures 5, 6:
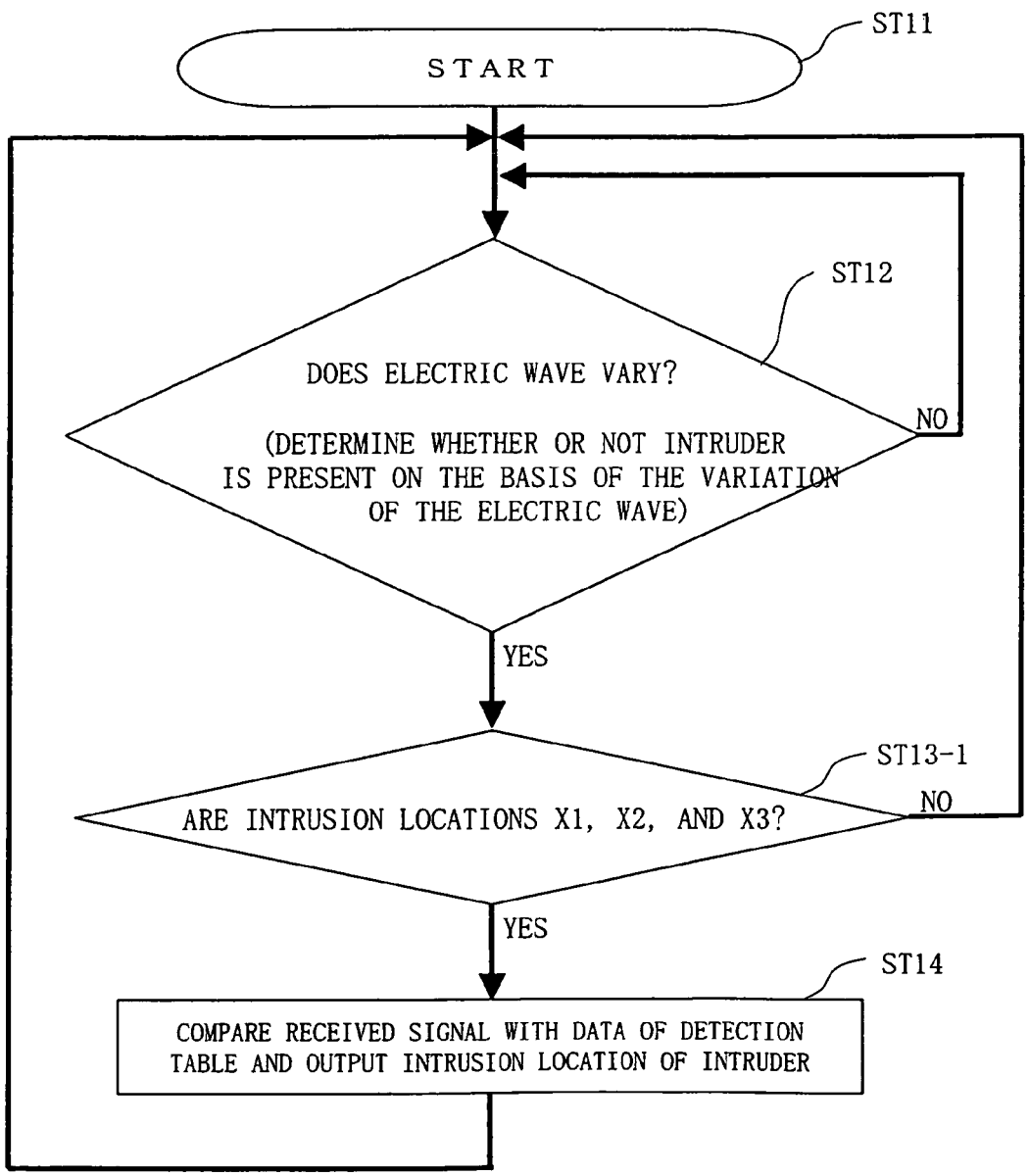
FIG. 5 is a view illustrating an example of a detection table according to the first embodiment of the invention.
FIG. 6 is a flowchart illustrating an example of operations of the intruder detection device according to the first embodiment of the invention.

Hereinafter, a first embodiment according to the invention will be described with reference to FIGS. 1 to 6. FIG. 1 is a view illustrating an example of a system configuration. FIG. 2 is a view illustrating an example of the concept of detection for an intrusion location. FIG. 3 is a view illustrating a specific example of a transmission signal. FIG. 4 is a block diagram illustrating an example of an inner configuration of an intruder detection device shown in FIG. 1. FIG. 5 is a view illustrating an example of a detection table. FIG. 6 is a flowchart illustrating an example of an operation of the intruder detection device. Here, the same reference numeral or the same reference symbol in each of the drawings represents the same part.

FIG. 1 shows an intruder detection system in which an intruder detection device 1 is connected to a leaky transmission path 21 of a transmission side and a leaky transmission path 22 of a receiving side provided together with the leaky transmission path 21 of the transmission side. The leaky transmission path 22 of the receiving side receives a leaky electric wave from the leaky transmission path 21 of the transmission side. If an electric wave received in the leaky transmission path 22 of the receiving side varies, the intruder detection system determines that an intruder is present. The leaky transmission path 21 of the transmission side and the leaky transmission path 22 of the receiving side include a plurality of leaky points 21TH, 21TH, ..., 21TH, 22TH, 22TH, ..., 22TH existing in a direction to which the respective leaky transmission path extends. The intruder detection system further includes an intrusion location detection unit 51 (see FIG. 4 which will be described later) which detects an intrusion location of an intruder on the basis of a signal, which is received signal in a receiving circuit 4 of the receiving side, affected by the leaky electric wave at each of the leaky points 21TH, 21TH, ..., 21TH, 22TH, 22TH, ..., 22TH. The intruder detection system 1 further includes a detection table 521 in which a detectable intrusion location is associated with a detection area. If intrusion location detection information of the intrusion location detection unit 51 corresponds to a detection area of the detection table 521, a detection result output unit 54 (see FIG. 4 which will be described later) outputs a detection result.

The intruder detection device 1 includes a transmission circuit 3, the receiving circuit 4, and an intrusion detection unit 5.

The leaky transmission path 21 of the transmission side and the leaky transmission path 22 of the receiving side may be, for example, a commercial leaky coaxial. The leaky points 21TH, 21TH, ..., 21TH, 22TH, 22TH, ..., 22TH of the leaky transmission path 21 of the transmission side and the leaky transmission path 22 of the receiving side may be, for example, penetration slots provided so as to penetrate an outer cover of the commercial leaky coaxial cable at predetermined intervals of every few meters.

Here, an example for concept of detection of an intrusion location will be described.

It is assumed that a commercial leaky coaxial cable is used as the leaky transmission path 21 of the transmission side and the leaky transmission path 22 of the receiving side, and the leaky transmission path 21 of the transmission side and the leaky transmission path 22 of the receiving side are buried while being separated at predetermined intervals of every few meters. As shown in FIG. 2, for example, when one transmission pulse is transmitted from the transmission circuit 3, a leaky electric wave from a first (initial) leaky point of the leaky transmission path 21 of the transmission side is received through a first (initial) leaky point of the leaky transmission path 22 of the receiving side and arrives in the receiving circuit 4 as a received signal. An arrival time of the leaky electric wave is the time taken from the starting time of signal transmission to a $\Delta T1$ point.

In the same way, when one transmission pulse is transmitted from the transmission circuit 3, a leaky electric wave from a second leaky point of the leaky transmission path 21 of the transmission side is received through a second leaky point of the leaky transmission path 22 of the receiving side and arrives in the receiving circuit 4 as a received signal. An arrival time of the leaky electric wave is the time taken from the starting time of signal transmission to a $\Delta T2$ point.

In the same way, an arrival time of a received signal which passes through a third leaky point is the time taken from the starting time of signal transmission to a $\Delta T3$ point.

Further, since a propagation rate of a signal is calculated by 300000 Km/second (in the case of the air), if the length of the signal transmission path is known, the arrival times $\Delta T1$, $\Delta T2$, $\Delta T3$, ..., that is, the arrival time $\Delta T$ can be easily acquired by using the above operation.

Therefore, by storing data of the arrival time $\Delta T$ calculated beforehand when configuring the system, the receiving circuit 4 can distinguish which leaky point (penetration slot) is passed through by the corresponding received signal by comparing the actually received signal with the stored data.

In addition, when an intruder enters a region where the leaky electric wave exists, a form of the leaky electric wave varies in response to the intruder.

Accordingly, if the intrusion detection unit 5 detects that the signal received in the receiving circuit 4 varies, it is possible to detect and inform an intrusion location along the leaky transmission path 21 of the transmission side and the leaky transmission path 22 of the receiving side.

Since a signal speed is very high and a detection operation speed of the receiving circuit is related to the signal speed, a unit pulse is not transmitted once every few seconds as the transmission signal. For example, as shown in FIG. 3, it is possible to improve detection accuracy by using a coded signal having a few million pulse strings, such as a PN code that is a pseudo noise spreading code. It is preferable to repeatedly transmit the same PN codes or sequentially transmit different PN codes. The PN code is generally well-known code.

When the PN code is used in the intruder detection system shown in FIG. 1, the intruder detection device 1 modulates a phase of a carrier wave having high-frequency as an output of the transmission circuit 3 which generates a spreading code and outputs the modulated carrier wave to the leaky transmission path 21 of the transmission side. The electric wave output from the leaky transmission path 21 of the transmission side is received in the leaky transmission path 22 of the receiving side and then received in the receiving circuit 4. In the receiving circuit 4, phases of the received electric wave are measured with a reference spreading code related to an intrusion distance and an electric intensity is informed to the intrusion detection unit 5. The intrusion detection unit 5 detects an intruder corresponding to the intrusion distance as the electric intensity varies.

The intruder detection system has a leaky transmission path 21 of a transmission side and a leaky transmission path 22 of a receiving side that is provided together with the leaky transmission path 21 of the transmission side and receives a leaky electric wave from the leaky transmission path 21 of a transmission side, and determines that an intruder is present when an electric wave received in the leaky transmission path 22 of the receiving side varies. In an investigation performed by the inventors of the invention, the leaky transmission paths 21 and 22 are buried while being separated about 1500 m and it has been understood that it is possible to detect whether or not an intruder is present between the leaky transmission paths 21 and 22 and the intrusion location over a long distance such as 1500 m.

If it is possible to detect whether or not an intruder is present and the intrusion location over a long distance such as about 1500 m, the intruder detection system can be applied to a factory, transformer substation, airport, parking lot, and so on. However, when the detection can be performed over a long distance such as about 1500 m, there may be, for example, a gate for the general public or a general road in a detection region in a detection region because of a long distance of about 1500 m. In this case, the intruder detection system should be designed to be able to distinguish between an intruder and a person passing through the gate for the general public or the general road by setting a non-detection region. For example, the leaky electric wave may be corrupted in accordance with the person passing through the gate for the general public or the general road such that the transmission signal varies. In this case, there should be a process for distinguishing between an intruder and the person passing through the gate for the general public or the general road.

Therefore, in the first embodiment according to the invention, as shown in FIG. 4, an intrusion detection unit 5 of the intruder detection device 1 includes a storage unit 52 which stores a detection table 521 so as to set a non-detection area in addition to the intrusion location detection unit 51. A CPU 53 compares information of an intrusion location detected by the intrusion location detection unit 51 with information set beforehand in the detection table 521. If the information of the intrusion location detected by the intrusion location detection unit 51 corresponds to a detection region set in the detection table 521, a detection result output unit 54 outputs the detection result. If the information of the intrusion location detected by the intrusion location detection unit 51 does not correspond to the detection region set in the detection table 521, a detection result output unit 54 does not output the detection result.

FIG. 5 is a diagram illustrating a specific example of the detection table 521.

In FIGS. 1 and 5, reference symbols X1, X2, and X3 denote a desired detection region (location) in which it is necessary to detect an intruder. Reference symbols Y1 and Y2 denote a non-detection region (location) in which it is not necessary to detect an intruder. In the detection table 521 shown in FIG. 5, the detectable intrusion locations X1, X2, X3, Y1, and Y2 are associated with a detection area and a non-detection area.

When intrusion location detection information in the intrusion location detection unit 51 corresponds to a detection area of the detection table 521, a detection result is output from the detection result output unit 54. When the intrusion location detection information in the intrusion location detection unit 51 corresponds to a non-detection area of the detection table 521, the detection result is not output from the detection result output unit 54.

Next, operations will be explained with reference to FIGS. 1 to 4 by using an operation flow chart shown in FIG. 6.

If an intruder enters between the leaky transmission paths 21 and 22 shown in FIG. 1, the intruder detection device 1 determines whether or not an electric wave varies. As a result, the intruder detection device 1 determines whether or not an intruder is present on the basis of the variation of the electric wave (step ST12 of FIG. 6).

As a result of a determination at step ST12 of FIG. 6, when the electric wave varies (when an intruder is present), the intrusion location detection unit 51 (see FIG. 4) detects if intrusion locations are X1, X2, and X3 (step ST13-1).

Next, a received signal (intrusion location detection information in the intrusion location detection unit) detected in step ST13-1 is compared with data of the detection table 521. In the case of intrusion detection in the intrusion detection area, it is conclusively determined that an intruder is present and the detection result output unit 54 outputs an intrusion location of the intruder (step ST14).

Further, in the case that the PN code is used, the detection regions X1, X2, and X3 are associated with the reference spreading code. For example, the detection range X1 is included in a range of a predetermined reference spreading code PNx1 to a predetermined reference spreading code PNxx.

Phases of the received electric wave is measured with a predetermined reference spreading code and an electric intensity corresponding to a predetermined reference spreading code is calculated. When it is determined that the electric intensity largely varies, it is considered as an intrusion in the predetermined reference spreading code, that is, an intrusion in the detection range X1.

In the first embodiment of the invention, as described above, the intrusion can be easily and precisely detected by comparing with the detection table 521. In addition, the detection region and the non-detection region can be set and the set of the detection region and the non-detection region can be changed. Further, it is possible to detect the intrusion over a long distance, for example, intervals at every 2 m or 5 m. Accordingly, an applicable region of the intruder detection system can be remarkably large.

Second Embodiment

Figures 7, 8:
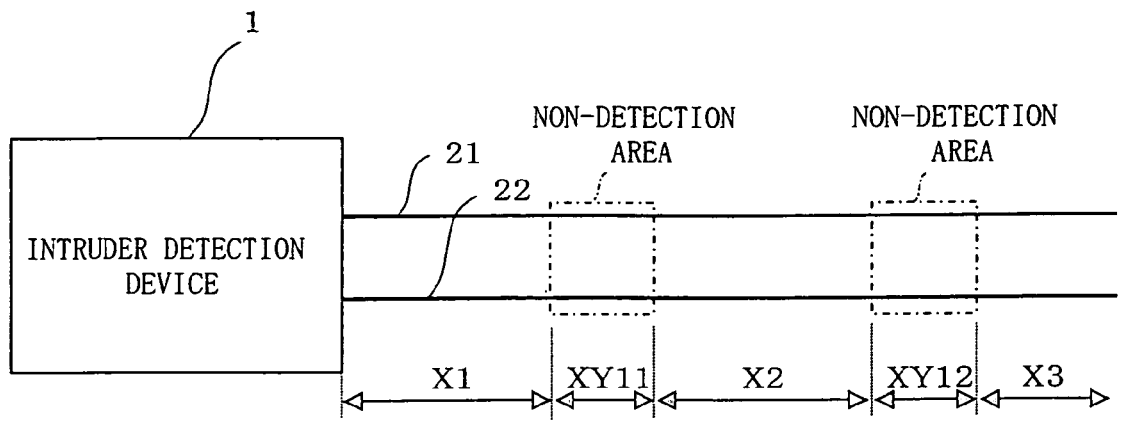
FIG. 7 is a view illustrating an example of a system configuration according to a second embodiment of the invention.
Figure 9:
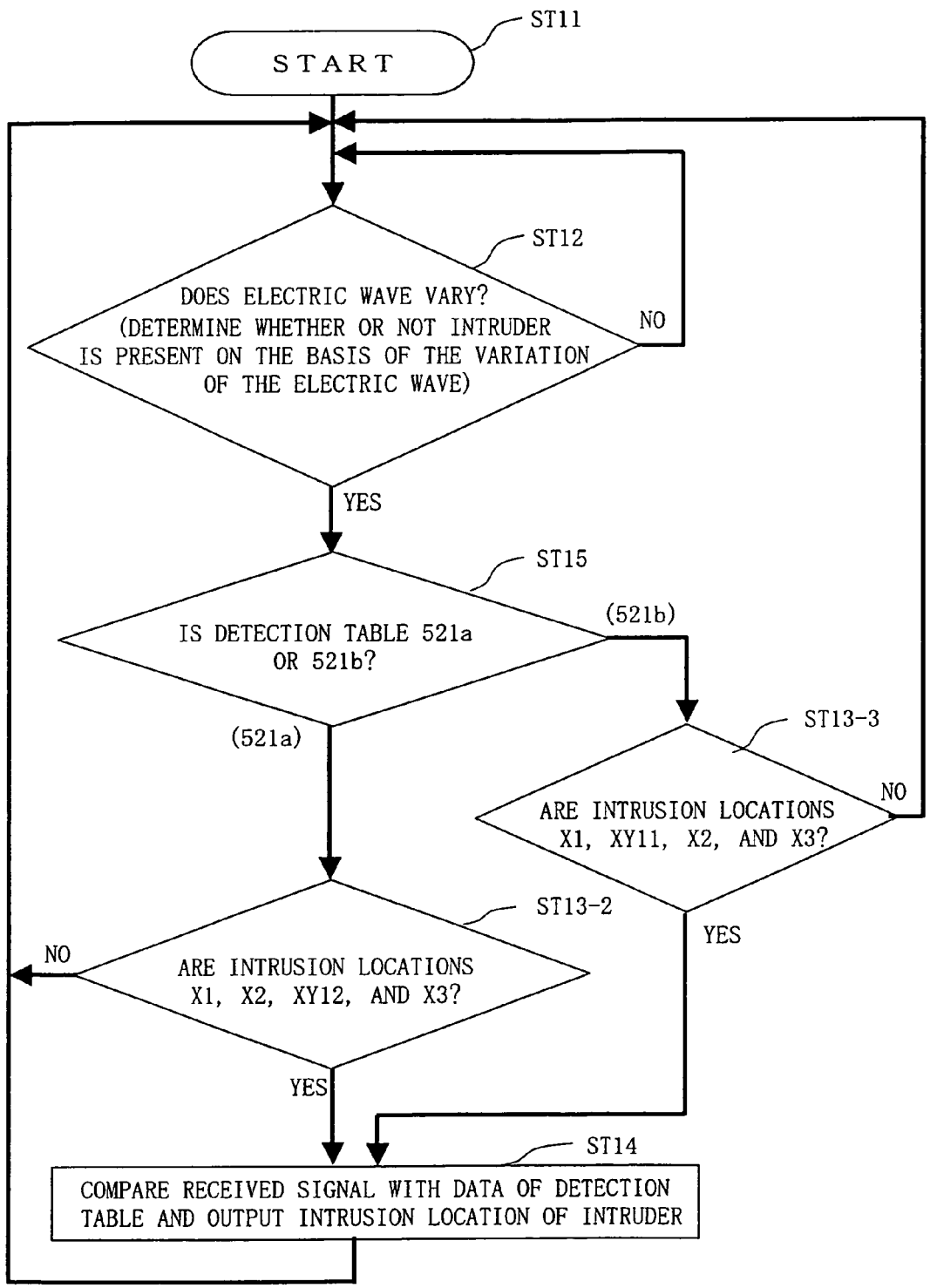
FIG. 9 is a flowchart illustrating an example of operations according to the second embodiment of the invention.

Hereinafter, a second embodiment according to the invention will be explained with reference to FIGS. 7 to 9. FIG. 7 is a view illustrating an example of a system configuration. FIGS. 8A and 8B are diagrams showing an example of a detection table. FIG. 9 is a flowchart illustrating an example of operations. In FIGS. 7 to 9, the same parts as those shown in FIGS. 1 to 6 described above are represented by the same reference numerals, and FIGS. 7 to 9 will be explained in respect to the different parts from FIGS. 1 to 6 and additional descriptions thereof will be omitted.

In the above-described first embodiment according to the invention, it has been exemplarily explained that the detection region can be predeterminedly set by the detection table 521. In the second embodiment according to the invention, as shown in FIG. 8, the detection can be performed by selectively using a detection table 521a or 521b which determines whether or not detection regions XY11 and XY12 are detected. In other words, a plurality of detection tables 521a, 521b, . . . , in which each of the correlations between detectable intrusion locations and detection areas are different are provided and the plurality of detection tables 521a, 521b, . . . , are selectively used.

Further, basic operations of the intruder detection system which uses the leaky transmission paths are the same as in the above-described first embodiment according to the invention.

As shown in FIGS. 8A and 8B, in the detection table 521a, a region XY11 is determined as a non-detection region and a region XY12 is determined as a detection region. Further, in the detection table 521b, the region XY11 is determined as a detection region and the region XY12 is determined as a non-detection region.

For example, the setting of the detection region can be easily changed by changing the detection table 521a to the detection table 521b or changing the detection table 521b to the detection table 521a.

In addition, a method of specifying the detection region is the same as that of the above-described first embodiment.

Next, operations will be explained with reference to an operation flowchart shown in FIG. 9.

If an intruder enters between the leaky transmission paths 21 and 22 shown in FIG. 7, the intruder detection device 1 determines whether or not an electric wave varies. As a result, the intruder detection device 1 determines whether or not an intruder is present on the basis of the variation of the electric wave (step ST12 of FIG. 9).

If it is determined that the electric wave varies (an intruder is present) in step ST12, it is determined which detection table is desired between the detection tables 521a and 521b (step ST15).

As the determination result in step ST15, in the case of detection table 521a, if the intrusion region corresponds to the desired detection regions X1, X2, X3, and XY12 indicated by the detection table 521a (step ST13-2), it is conclusively determined that an intruder is present and the detection result output unit 54 (see FIG. 4) outputs an intrusion location of the intruder (step ST14).

As the determination result in step ST15, in the case of detection table 521b, if the intrusion region corresponds to the desired detection regions X1, X2, X3, and XY11 indicated in the detection table 521b (step ST13-3), it is conclusively determined that an intruder is present and the detection result output unit 54 outputs an intrusion location of the intruder (step ST14).

In the second embodiment according to the invention, two kinds of detection tables 521a and 521b have been explained but the operations are the same even in the case of three or more kinds of detection tables.

In addition, in the above-described second embodiment according to the invention, it is possible to obtain the intruder detection system which uses leaky transmission paths and is capable of easily and precisely changing and adding detection regions by checking the detection region with reference to the detection tables 521a and 521b.

Third Embodiment

Figure 12:
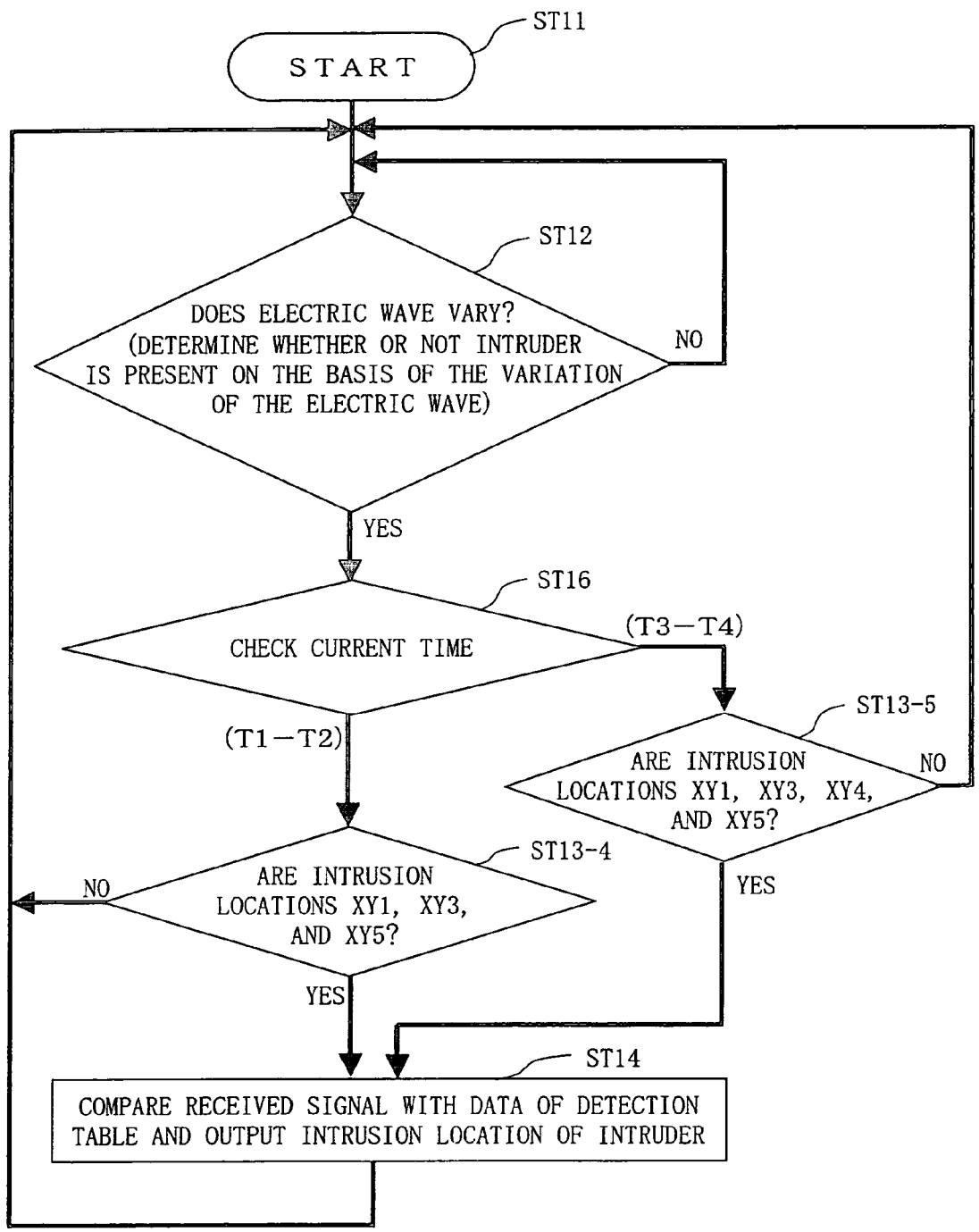
FIG. 12 is a flowchart illustrating an example of operations according to the third embodiment of the invention.

Hereinafter, a third embodiment will be explained with reference to FIGS. 10 to 12. FIG. 10 is a view illustrating an example of a system configuration. FIG. 11 is a diagram showing an example of a detection table. FIG. 12 is a flowchart illustrating an example of operations. In FIGS. 10 to 12, the same parts as those shown in FIGS. 1 to 9 described above are represented by the same reference numerals, and FIGS. 10 to 12 will be explained in respect to the different parts from FIGS. 1 to 9 and additional descriptions thereof will be omitted.

In the above-described first embodiment according to the invention, it has been exemplarily explained that a detection region can be predeterminedly set by the detection table 521. In the third embodiment according to the invention, as shown in FIG. 11, the detection can be performed by using a detection table 521c in which it is determined whether or not to detect detection regions XY1, XY2, XY3, XY4, and XY5 in accordance with time regions T1-T2, T3-T4, T5-T6, . . . ,. In other words, the correlation between a detectable intrusion location and a detection area is set in the unit of time T1-T2, T3-T4, T5-T6, . . . , in the detection table 521c. In the corresponding time, correlation data between a detectable intrusion location and a detection area, which corresponds to the corresponding time, is used.

For example, in the case of the time T1-T2, data in which the detection region XY1 is determined as detection, the detection region XY2 is determined as non-detection, the detection region XY3 is determined as detection, the detection region XY4 is determined as non-detection, and the detection region XY5 is determined as detection is used. In the case of the time T3-T4, data in which the detection region XY1 is determined as detection, the detection region XY2 is determined as non-detection, the detection region XY3 is determined as detection, the detection region XY4 is determined as detection, and the detection region XY5 is determined as detection is used.

Further, basic operations of the intruder detection system which uses the leaky transmission paths are the same as the above-described first embodiment according to the invention.

In the third embodiment according to the invention, a detection region can be easily set depending on a schedule by using the detection table 521c which determines whether or not to detect a region in accordance with a time region.

In addition, a method of specifying the detection region is the same as that of the above-described first embodiment.

Next, operations will be explained with reference to an operation flowchart shown in FIG. 12.

If an intruder enters between the leaky transmission paths 21 and 22 shown in FIG. 10, the intruder detection device 1 determines whether or not an electric wave varies. As a result, the intruder detection device 1 determines whether or not an intruder is present on the basis of the variation of the electric wave (step ST12 of FIG. 12).

If it is determined that the electric wave varies (an intruder is present) in step ST12, a row of the detection table which matches with a current time in the detection table 521c, for example, the time region T1-T2 is determined (step ST16).

In the case of time region T1-T2, if the electric wave varies in the intrusion detection regions XY1, XY3, and XY5 indicated in the detection table 521c (step ST13-4), it is conclusively determined that an intruder is present and the detection result output unit 54 (see FIG. 4) outputs an intrusion location of the intruder (step ST14).

In the case of time region T3-T4, if the electric wave varies in the desired intrusion detection regions XY1, XY3, XY4, and XY5 indicated in the detection table 521c (step ST13-5), it is conclusively determined that an intruder is present and the detection result output unit 54 (see FIG. 4) outputs an intrusion location of the intruder (step ST14).

In the case of time region T5-T6 or in other cases, operations are the same as described above even though those are not shown in the flowchart of FIG. 12.

In addition, in the above-described third embodiment, it is possible to obtain the intruder detection system which uses leaky transmission paths and is capable of easily and precisely changing and adding detection regions while using a time schedule by checking the detection regions with reference to the detection table 521c.

Fourth Embodiment

Figures 13, 14:
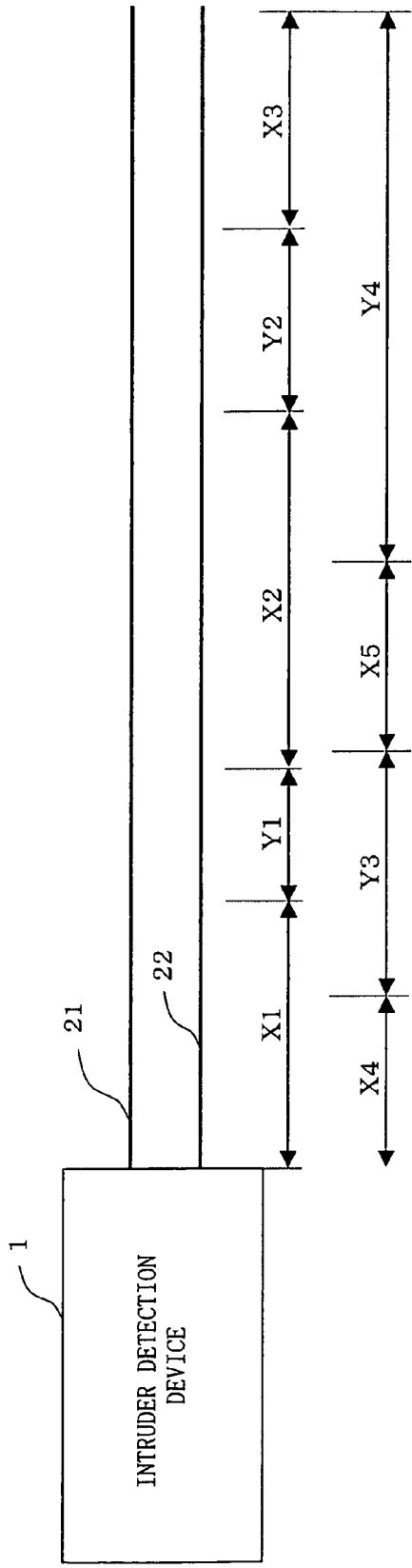
FIG. 13 is a view illustrating an example of a system configuration according to a fourth embodiment of the invention.
FIG. 14 is a diagram showing an example of a detection table according to the fourth embodiment of the invention.
Figure 15:
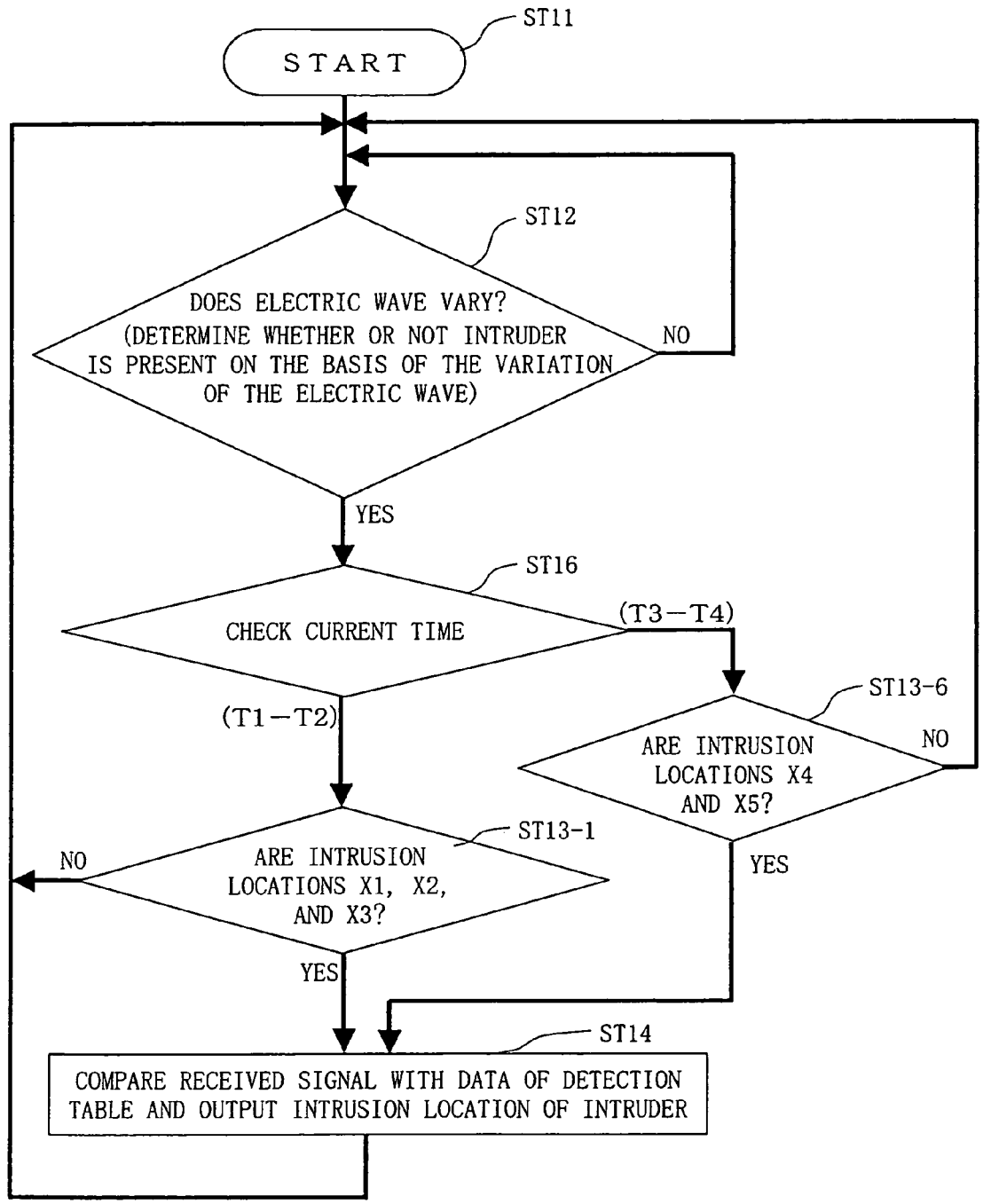
FIG. 15 is a flowchart illustrating an example of operations according to the fourth embodiment of the invention.

Hereinafter, a fourth embodiment will be explained with reference to FIGS. 13 to 15. FIG. 13 is a view illustrating an example of a system configuration. FIG. 14 is a diagram showing an example of a detection table. FIG. 15 is a flowchart illustrating an example of operations. In FIGS. 13 to 15, the same parts as those shown in FIGS. 1 to 12 described above are represented by the same reference numerals, and FIGS. 13 to 15 will be explained in respect to the different parts from FIGS. 1 to 12 and additional descriptions thereof will be omitted.

In the above-describe first embodiment according to the invention, it has been exemplarily explained that the detection region can be predeterminedly set by the detection table 521. In the fourth embodiment according to the invention, as shown in FIG. 14, the detection can be performed by using a detection table 521d in which the detection regions can be arbitrarily changed in accordance with a time region. The time of the detection table can be changed. In other words, a set region of the detection area in the detection table can be changed and the time in the detection table can be changed.

Further, basic operations of the intruder detection system which uses the leaky transmission paths are the same as the above-described first embodiment according to the invention.

In the fourth embodiment according to the invention, operations will be explained in the case that regions X1, X2, X3, X4, and X5 are defined as detection regions, and regions Y1, Y2, Y3, and Y4 are defined as the non-detection regions during the time regions T1-T2 and T3-T4. However, the operations are the same even though the detection regions, the non-detection regions, or the time regions increase.

In the fourth embodiment according to the invention, the detection region can be easily set depending on a schedule with respect to an arbitrary detection location by using the detection table 521d in which it is determined whether or not to detect an arbitrary detection location.

In addition, a method of specifying the detection region is the same as that of the above-described first embodiment.

Next, operations will be explained with reference to an operation flowchart shown in FIG. 15.

If an intruder enters between the leaky transmission paths 21 and 22 shown in FIG. 13, the intruder detection device 1 determines whether or not an electric wave varies. As a result, the intruder detection device 1 determines whether or not an intruder is present on the basis of the variation of the electric wave (step ST12 of FIG. 15).

If it is determined that the electric wave varies (an intruder is present) in step ST12, a row of the detection table which matches with a current time in the detection table 521d, for example, the time region T1-T2 is determined (step ST16).

In the case of time region T1-T2, if the electric wave varies in the desired intrusion detection regions X1, X2, and X3 indicated in the detection table 521d (step ST13-1), it is conclusively determined that an intruder is present and the detection result output unit 54 (see FIG. 4) outputs an intrusion location of the intruder (step ST14).

In the case of time region T3-T4, if the electric wave varies in desired detection regions X4 and X5 indicated in the detection table 521d (step ST13-6), it is conclusively determined that an intruder is present and the detection result output unit 54 (see FIG. 4) outputs an intrusion location of the intruder (step ST14).

In the case of time region T5-T6 or in other cases, operations are the same as described above even though those are not shown in the flowchart of FIG. 15.

In addition, in the above-described fourth embodiment according to the invention, it is possible to obtain the intruder detection system which uses leaky transmission paths and is capable of easily and precisely changing and adding detection regions with respect to an arbitrary detection location while using a time schedule by checking the detection regions with reference to the detection table 521d.

Fifth Embodiment

Figure 18:
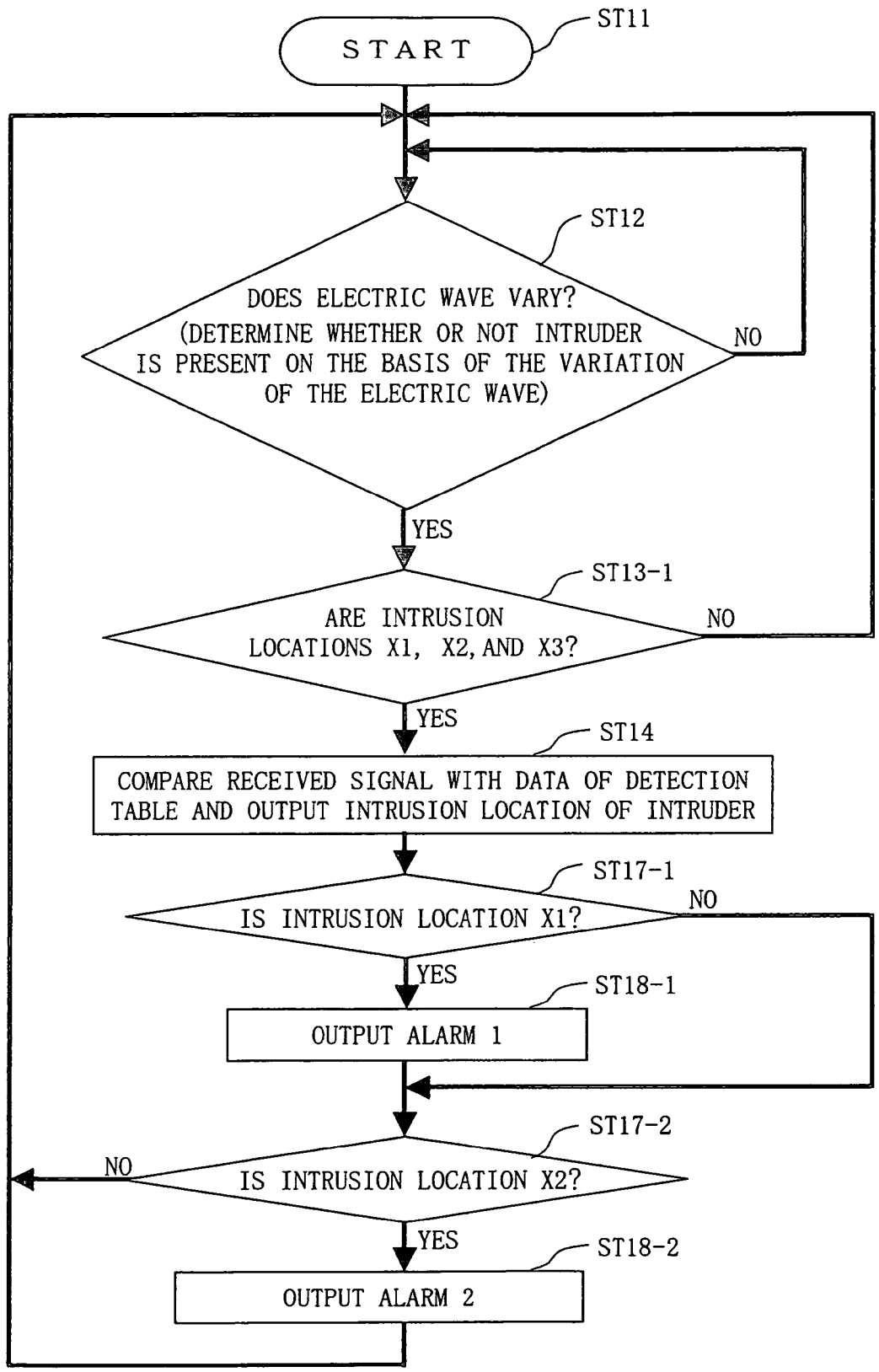
FIG. 18 is a flowchart illustrating an example of operations according to the fifth embodiment of the invention.

Hereinafter, a fifth embodiment will be explained with reference to FIGS. 16 to 18. FIG. 16 is a view illustrating an example of a system configuration. FIG. 17 is a diagram showing an example of a detection table. FIG. 18 is a flowchart illustrating an example of operations. In FIGS. 16 to 18, the same parts as those shown in FIGS. 1 to 15 described above are represented by the same reference numerals, and FIGS. 16 to 18 will be explained in respect to the different parts from FIGS. 1 to 15 and additional descriptions thereof will be omitted.

In the above-describe first embodiment according to the invention, it has been exemplarily explained that the detection region can be predeterminedly set by the detection table 521. In the fifth embodiment according to the invention, as shown in a detection table 521e of FIG. 17, an alarm can be output in accordance with a detection location. In addition, as a result of the intrusion detection, the alarm output can be different depending on a detection area when the intrusion is detected.

Further, basic operations of the intruder detection system which uses the leaky transmission paths are the same as the above-described first embodiment according to the invention.

In addition, a method of specifying the detection region is the same as that of the above-described first embodiment.

Next, operations will be explained with reference to an operation flowchart shown in FIG. 18.

If an intruder enters between the leaky transmission paths 21 and 22 shown in FIG. 16, the intruder detection device 1 determines whether or not an electric wave varies. As a result, the intruder detection device 1 determines whether or not an intruder is present on the basis of the variation of the electric wave (step ST12 of FIG. 18).

If it is determined that the electric wave varies (an intruder is present) in step ST12 in the desired detection regions X1, X2, and X3 indicated in the detection table 521e (step ST13-1), it is conclusively determined that an intruder is present and the detection result output unit 54 (see FIG. 4) outputs an intrusion location of the intruder (step ST14).

Thereafter, if the intrusion location of the intruder is the detection region X1 (step ST17-1), an alarm 1 is output (step ST18-1). In addition, if the intrusion location of the intruder is the detection region X2 (step ST17-2), an alarm 2 is output (step ST18-2).

Further, in the fifth embodiment according to the invention, even though only the cases corresponding to alarms 1 and 2 have been described, the same operations can be applied with respect to the other alarms.

Further, in the same manner as the other embodiments described above, the same operations can be applied even in the case of the detection table related to date and time.

In addition, in the above-described fifth embodiment according to the invention, it is possible to obtain the intruder detection system which uses leaky transmission paths and is capable of easily setting a detection region with reference to the detection table 521*e* and easily and precisely raising an alarm in accordance with a detection location.

Sixth Embodiment

Figure 19:
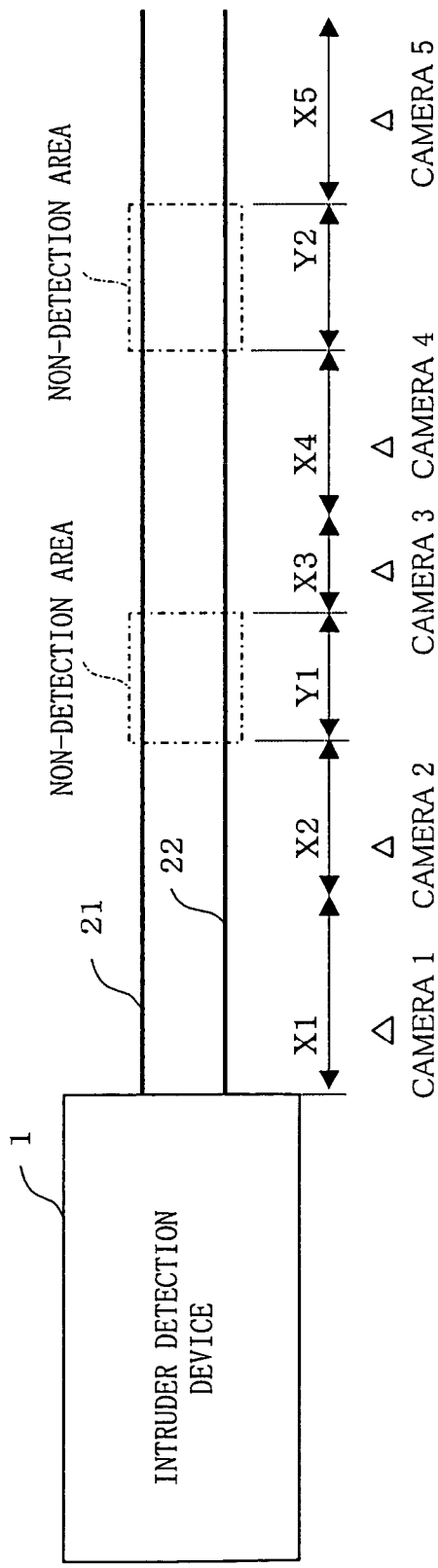
FIG. 19 is a view illustrating an example of a system configuration according to a sixth embodiment of the invention.
Figure 21:
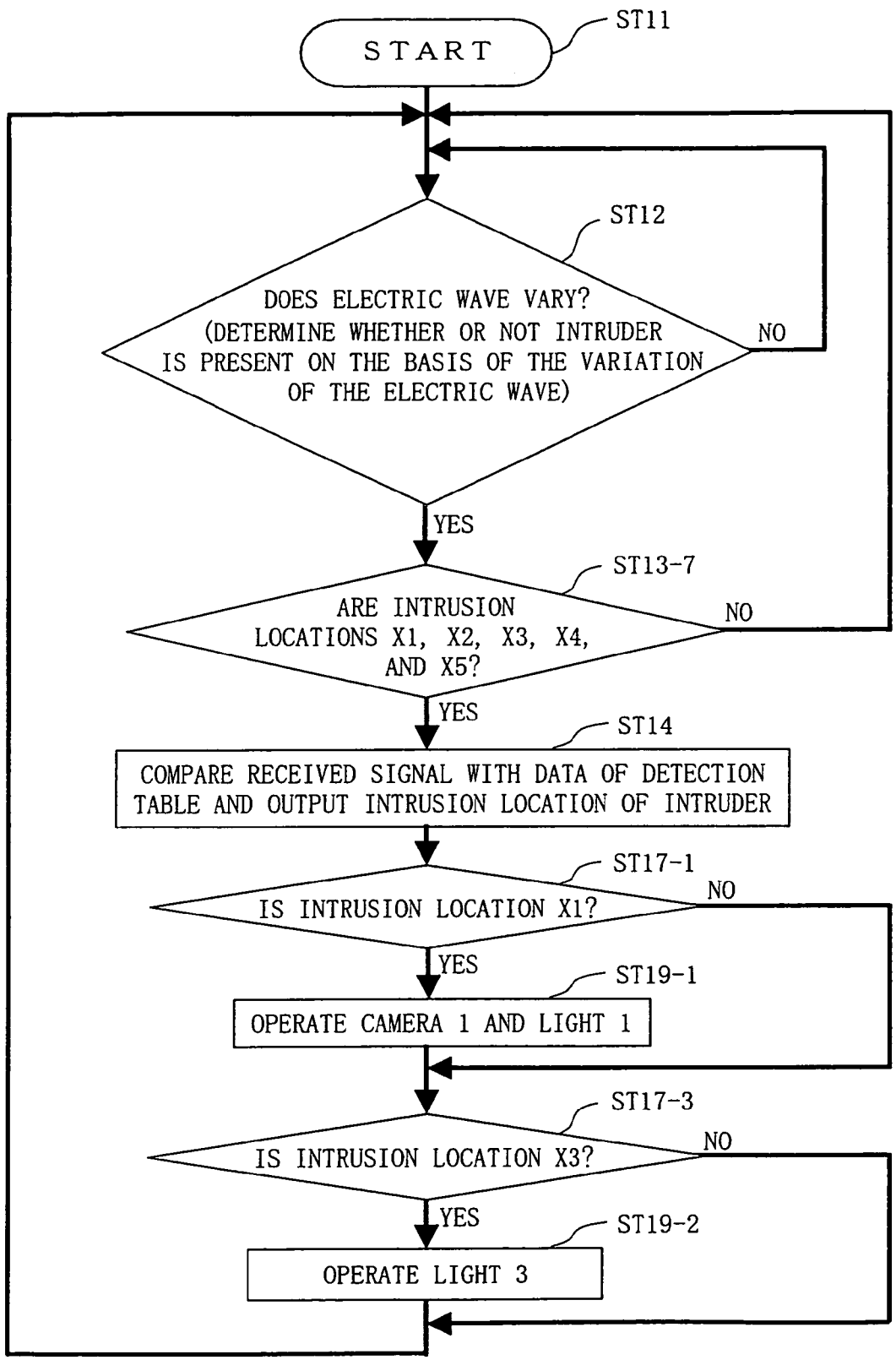
FIG. 21 is a flowchart illustrating an example of operations according to the sixth embodiment of the invention.

Hereinafter, a sixth embodiment will be explained with reference to FIGS. 19 to 21. FIG. 19 is a view illustrating an example of a system configuration. FIG. 20 is a diagram showing an example of a detection table. FIG. 21 is a flowchart illustrating an example of operations. In FIGS. 19 to 21, the same parts as those shown in FIGS. 1 to 18 described above are represented by the same reference numerals, and FIGS. 19 to 21 will be explained in respect to the different parts from FIGS. 1 to 18 and additional descriptions thereof will be omitted.

In the above-described fifth embodiment according to the invention, it has been explained that the intrusion detection collaborates with the alarm in accordance with the detection table 521*e*. In the sixth embodiment according to the invention, as shown in a detection table 521*f* of FIG. 20, it is possible that the intrusion detection collaborates with a security camera or a light in accordance with a detection location. In other words, when intrusion is detected, at least one of the security camera and the light provided at the corresponding intrusion location is operated.

In addition, basic operations of the intruder detection system which uses the leaky transmission paths are the same as those of the first embodiment.

In addition, a method of specifying the detection region is the same as that of the first embodiment.

Next, operations will be explained with reference to an operation flowchart shown in FIG. 21.

If an intruder enters between the leaky transmission paths 21 and 22 shown in FIG. 19, the intruder detection device 1 determines whether or not an electric wave varies. As a result, the intruder detection device 1 determines whether or not an intruder is present on the basis of the variation of the electric wave (step ST12 of FIG. 21).

If it is determined that the electric wave varies (an intruder is present) at step ST12 in the desired detection regions X1, X2, X3, X4, and X5 indicated in the detection table 521*f* (step ST13-7), it is conclusively determined that an intruder is present and the detection result output unit 54 (see FIG. 4) outputs an intrusion location of the intruder (step ST14)

Thereafter, in the case that the intrusion location of the intruder is the region X1 (step ST17-1), a security camera 1 and a light 1 are operated (step ST19-1). In addition, in the case that the intrusion location of the intruder is the region X3 (step ST17-3), a light 3 is operated (step ST19-2).

In the sixth embodiment according to the invention, it has been exemplarily explained in the case of detection regions X1 and X3, and operations are the same in the case of the other regions X2, X4, and X5.

In addition, as the above-described other embodiments, operations are the same in a detection table related to the date and time.

Further, in the above-described sixth embodiment according to the invention, it is possible to obtain the intruder detection system which uses leaky transmission paths and is capable of easily setting a detection region with reference to the detection table 521*f* and easily and precisely operating a security camera and a light in accordance with a detection location.

Seventh Embodiment

Figures 22, 23:
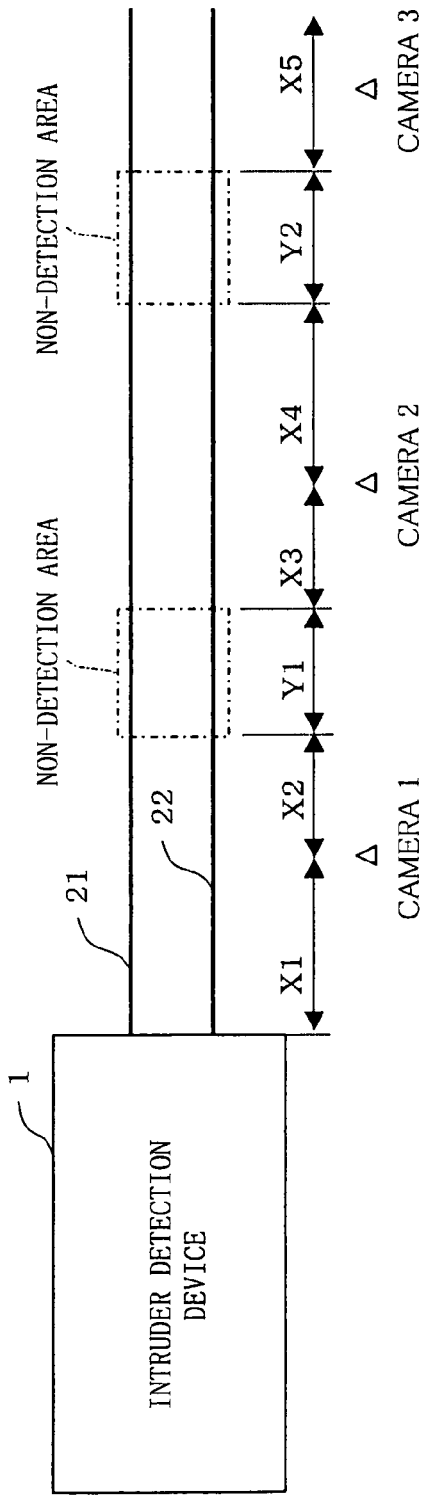
FIG. 22 is a view illustrating an example of a system configuration according to a seventh embodiment of the invention.
FIG. 23 is a diagram showing an example of a detection table according to the seventh embodiment of the invention.
Figure 24:
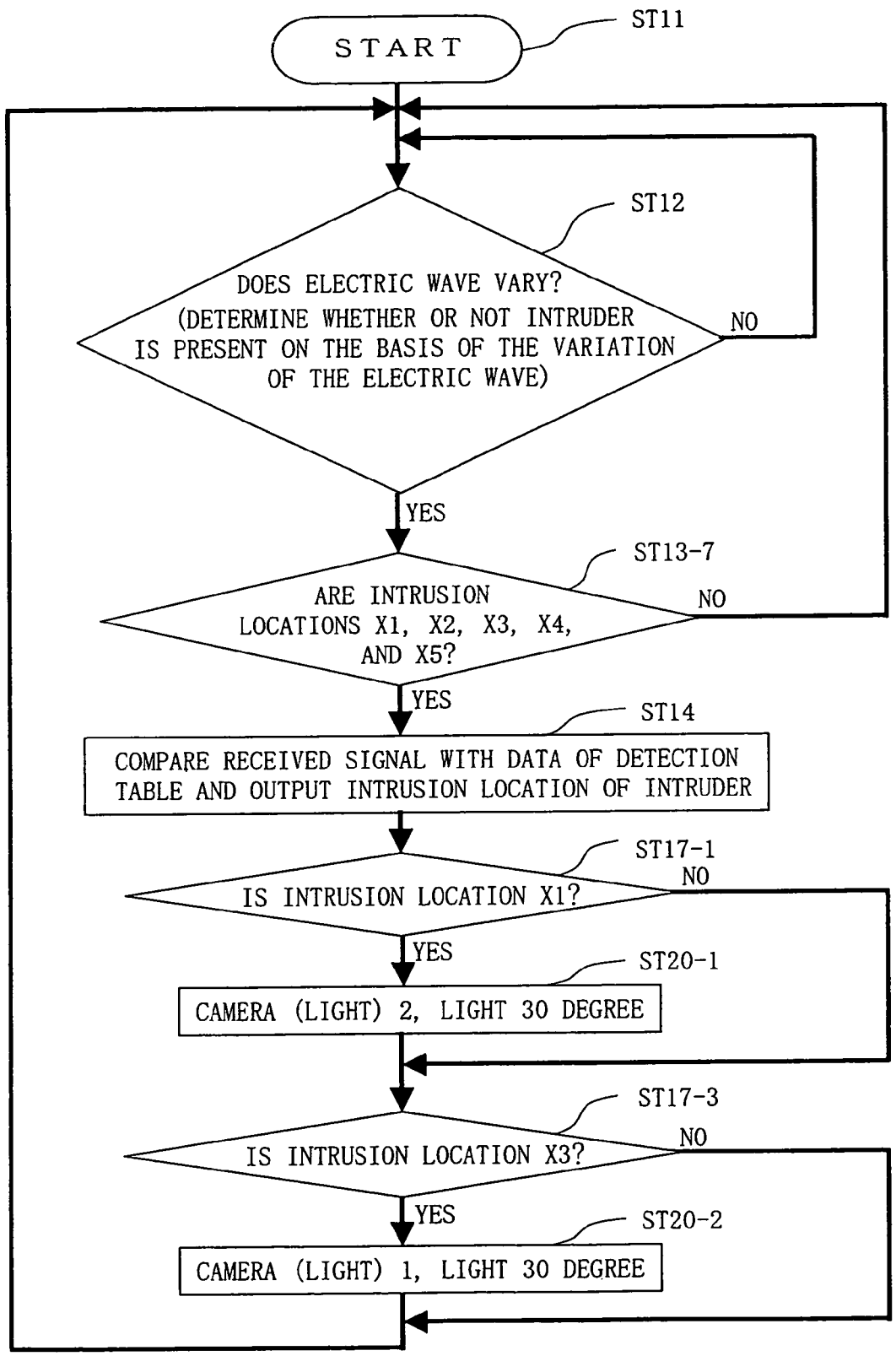
FIG. 24 is a flowchart illustrating an example of operations according to the seventh embodiment of the invention.

Hereinafter, a seventh embodiment will be explained with reference to FIGS. 22 to 24. FIG. 22 is a view illustrating an example of a system configuration. FIG. 23 is a diagram showing an example of a detection table. FIG. 24 is a flowchart illustrating an example of operations. In FIGS. 22 to 24, the same parts as those shown in FIGS. 1 to 21 described above are represented by the same reference numerals, and FIGS. 22 to 24 will be explained in respect to the different parts from FIGS. 1 to 21 and additional descriptions thereof will be omitted.

In the above-described sixth embodiment according to the invention, it has been explained that a security camera and a light collaborate so as to detect the intrusion depending on a detection location in accordance with the detection table 521*f* by using a fixed security camera and a light. In the seventh embodiment according to the invention, it is possible to make the security camera collaborate with the light depending on a detection location in accordance with a detection table 521*g* shown in FIG. 23 by using a rotatable security camera or a rotatable light. In other words, at least one of the security camera and the light can rotate and, when intrusion is detected, at least one of the security camera and the light provided in the corresponding intrusion location is rotatably operated.

In addition, basic operations of the intruder detection system which uses the leaky transmission paths are the same as those of the first embodiment.

In addition, a method of specifying the detection region is the same as that of the first embodiment.

Next, operations will be explained with reference to an operation flowchart shown in FIG. 24.

If an intruder enters between the leaky transmission paths 21 and 22 shown in FIG. 22, the intruder detection device 1 determines whether or not an electric wave varies. As a result, the intruder detection device 1 determines whether or not an intruder is present on the basis of the variation of the electric wave (step ST12 of FIG. 24).

In step ST12, if it is determined that the electric wave varies (an intruder is present) in the desired detection regions X1, X2, X3, X4, and X5 indicated in the detection table 521*g* (step ST13-7), it is conclusively determined that an intruder is present and the detection result output unit 54 (see FIG. 4) outputs an intrusion location of the intruder (step ST14).

Thereafter, in the case when the intrusion location of the intruder is the region X1 (step ST17-1), a security camera (light) 1 is operated so as to be rotated 30 degrees in the left direction (step ST20-1). In addition, in the case when the intrusion location of the intruder is the region X3 (step ST17-3), a security camera (light) 2 is operated so as to be rotated 30 degrees in the left direction (step ST20-2).

Further, in the seventh embodiment according to the invention, it has been exemplarily explained in the case of detection regions X1 and X3, the operations are the same in the case of the other regions X2, X4, and X5.

In addition, as the above-described other embodiments, operations are the same in a detection table related to the date and time.

Further, in the above-described seventh embodiment according to the invention, it is possible to obtain the intruder detection system which uses leaky transmission paths and is capable of easily setting a detection region with reference to the detection table 521*g* and easily and precisely operating a security camera and a light at low cost by using a rotatable security camera or light in accordance with the detection location.

Eighth Embodiment

Figure 25:
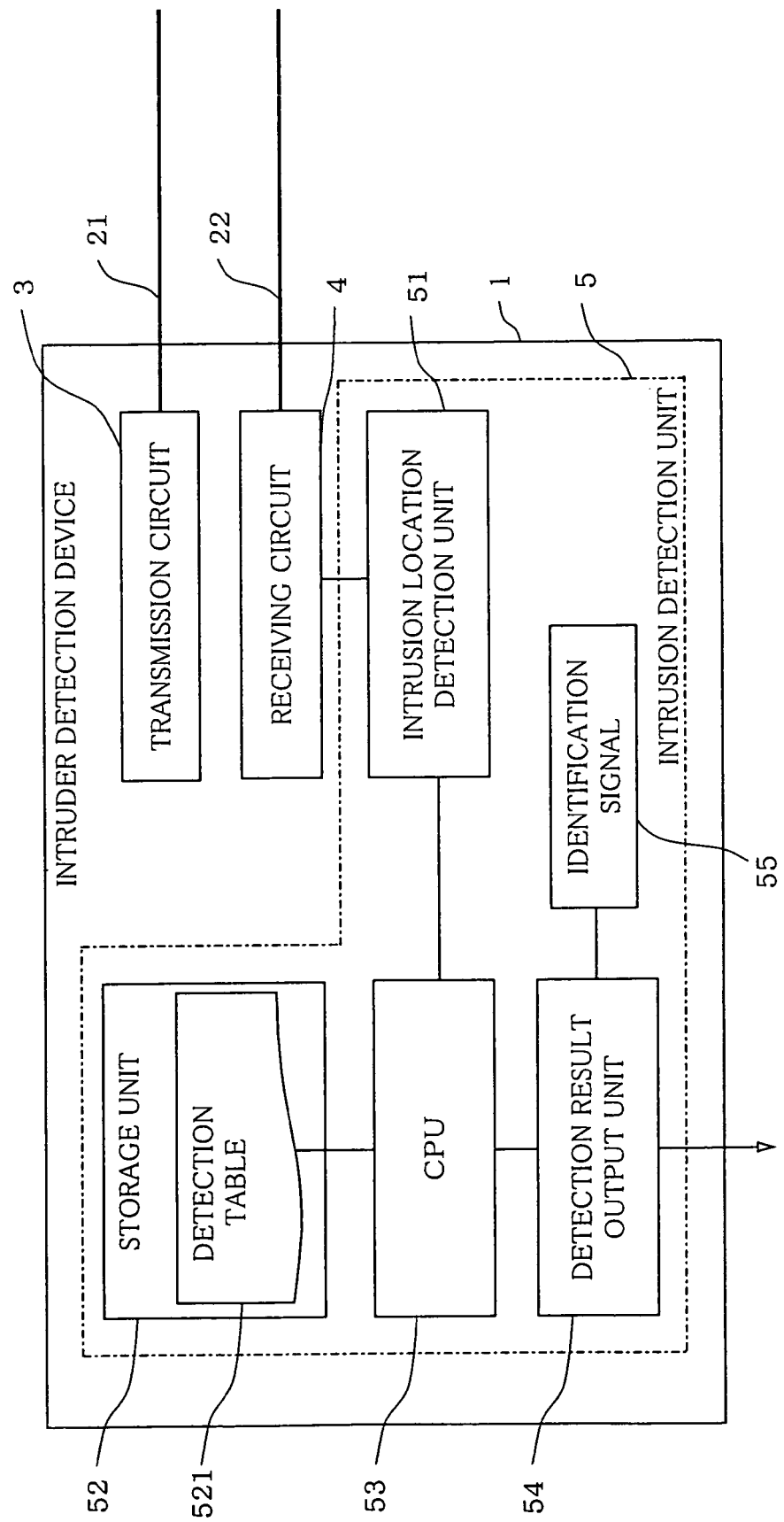
FIG. 25 is a view illustrating an example of an inner configuration of the intruder detection system according to an eighth embodiment of the invention.
Figure 26:
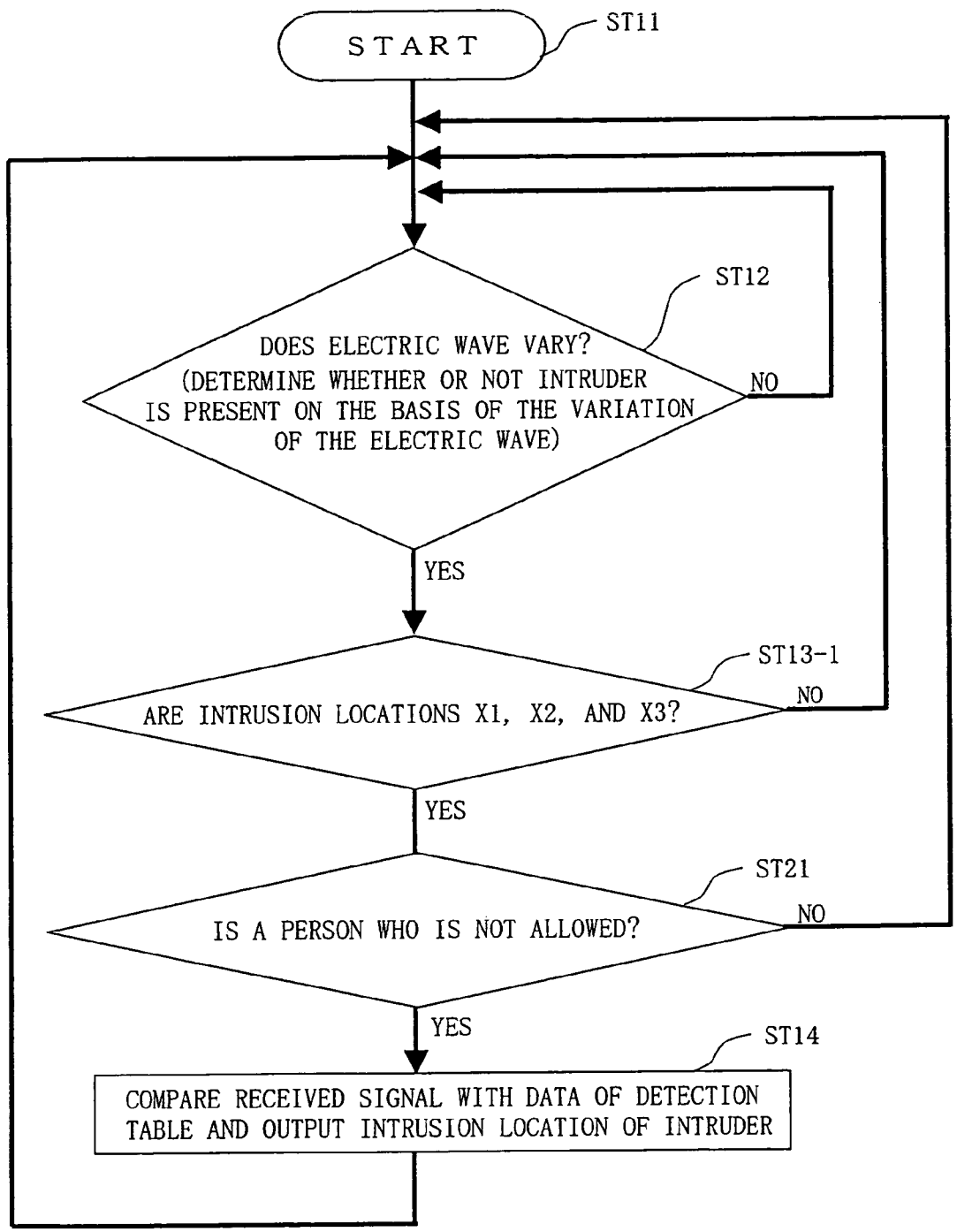
FIG. 26 is a flowchart illustrating an example of operations according to the eighth embodiment of the invention.
Figure 27:
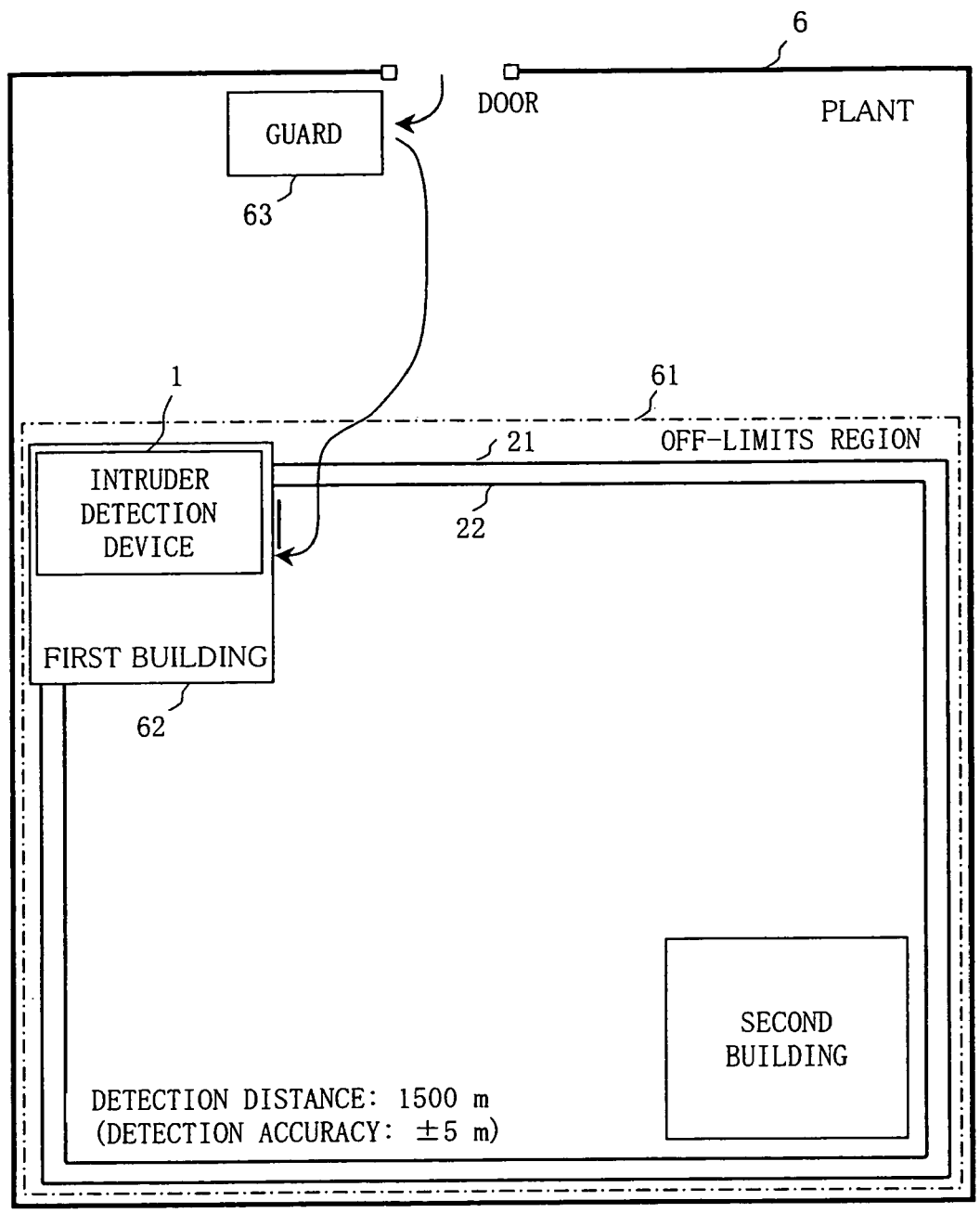
FIG. 27 is a view illustrating an example to which the intruder detection system is applied according to the eighth embodiment of the invention.

Hereinafter, a seventh embodiment will be explained with reference to FIGS. 25 to 27. FIG. 25 is a view illustrating an example of an inner configuration of the intruder detection system. FIG. 26 is a flowchart illustrating an example of operations. FIG. 27 is a view illustrating an example to which the intruder detection system is applied. In FIGS. 25 to 27, the same parts as those shown in FIGS. 1 to 24 described above are represented by the same reference numerals, and FIGS. 25 to 27 will be explained in respect to the different parts from FIGS. 1 to 24 and additional descriptions thereof will be omitted.

As described above, since the intruder detection system that includes a leaky transmission path of a transmission side and a leaky transmission path of a receiving side, the transmission path of the receiving side being provided together with the leaky transmission path of the transmission side and receiving a leaky electric wave from the leaky transmission path of the transmission side, and that determines whether or not an intruder is present when an electric wave received in the leaky transmission path of the receiving side varies, can detect the intrusion over long distances or large areas, the intruder detection system can be broadly used in a place such as a factory, transformer substation, airport, water disposal place, or parking lot. However, there are many cases when a person who is allowed to access a desired intrusion region enters a desired intrusion detection region. Therefore, when the person who is allowed to access a desired intrusion detection region enters the desired intrusion detection region, it is necessary to temporarily hold the intrusion detection output (for example, an alarm) so as not to be generated. Accordingly, in the eighth embodiment according to the invention, as shown in FIG. 25, for the person who is allowed to access a desired intrusion detection region, an identification signal 55 is transmitted to the detection result output unit 54 such that the detection result output unit 54 is temporarily held so as not to output the detection result.

As shown in FIG. 26 which shows the flow of operations, step ST21 is prepared between step ST13-1 and step ST14 described above, and the identification signal 55 determines if a person is allowed to access the corresponding intrusion detection region in step ST21. If it is determined that the person is allowed to access (not intruder) in step ST21, the process returns to step ST12. If it is determined that the person is not allowed to access (intruder) in step ST21, the process proceeds to step ST14.

Further, in FIG. 26, step ST21 described above is prepared between step ST13-1 and step ST14 of FIG. 6 described above.

FIG. 27 shows an example in which the eighth embodiment according to the invention is applied to a factory 6. A person who is allowed to access a first building 62 in an off-limits region 61 by a guard 63 goes across the leaky transmission paths 21 and 22 in order to reach the first building 62 as shown by the arrows. Therefore, the intruder detection device 1 is operated and attempts to output a detection result. However, as described above, the identification signal 55 is transmitted to the detection result output unit 54 and the detection result output unit 54 is temporarily held so as not to output the detection result.

What is claimed is:
1. An intruder detection system comprising:
a leaky transmission path of a transmission side, the leaky transmission path of the transmission side having a plurality of leaky points existing in a direction to which the leaky transmission path of the transmission path extends;
a leaky transmission path of a receiving side that is provided together with the leaky transmission path of the transmission side and that receives a leaky electric wave from the leaky transmission path of the transmission side, the leaky transmission path of the receiving side having a plurality of leaky points existing in a direction to which the leaky transmission path of the receiving side extends, wherein the leaky transmission path of the transmission side and the leaky transmission path of the receiving side form a detectable region therebetween for detecting an intruder, the detectable region including a detection area in which detection of an intruder is necessary and a non-detection area in which detection of an intruder is not necessary;
a receiving circuit that receives signals respectively corresponding to leaky electric waves at the leaky points of the receiving side;
an intrusion location detection unit that detects an intrusion location of an intruder within the detectable region, on the basis of whether one of the signals received by the receiving circuit indicates a variation of a corresponding one of the leaky electric waves at a corresponding one of the leaky points from which the one of the signals is received by the receiving circuit, and that outputs intrusion location information indicating the detected intrusion location of the intruder;
a storage unit having stored therein a detection table in which a plurality of detectable intrusion locations within the detectable region are respectively defined in association with one of the detection area of the detectable region and the non-detection area of the detectable region, wherein at least one of said plurality of detectable intrusion locations within the detectable region is defined in the detection table as being within the detection area of the detectable region, and at least one other one of said plurality of detectable intrusion locations within the detectable region is defined in the detection table as being within the non-detection area of the detectable region;
a processing unit that compares the intrusion location indicated in the intrusion location information output from the intrusion location detection unit with said plurality of detectable intrusion locations defined in the detection table to determine whether one of an intruder and a non-intruder is present in the intrusion location indicated in the intrusion location information output from the intrusion location detection unit, wherein the processing unit determines that an intruder is present in the intrusion location indicated in the intrusion location information when the intrusion location corresponds to the at least one of said detectable intrusion locations which is defined in the detection table as being within the detection area of the detectable region, and determines that a non-intruder is present in the intrusion location indicated in the intrusion location information when the intrusion location corresponds to the at least one other one of said detectable instruction locations which is defined in the detection table as being within the non-detection area of the detectable region; and a detection result output unit that outputs a detection result indicating the presence of the intruder in the detection area of the detectable region, when the processing unit determines that the intruder is present in the intrusion location indicated in the intrusion location information output from the intrusion location detection unit.

2. The intruder detection system according to claim 1, wherein the storage area is configured to accommodate a change to the detection area in the detection table, and store the changed detection area in the detection table.

3. The intruder detection system according to claim 1, wherein, in the detection table, the detectable intrusion locations are respectively defined in the detection table with reference to a respective distance of the detectable intrusion locations from a predetermined reference point.

4. The intruder detection system according to claim 1, wherein the storage unit has stored therein a plurality of detection tables having respectively different defined associations as to whether the detectable intrusion locations are within the detection area and the non-detection area of the detectable region, and wherein the processing unit is configured to selectively use individual ones of the plurality of detection tables to determine the existence of an intruder and a non-intruder based on the intrusion location information output from the intrusion location detection unit.

5. The intruder detection system according to claim 1, wherein, in the detection table, the defined association between the detectable intrusion locations and the detection area is set in units of date and time, and in the case of the corresponding date and time, associative data between the detectable intrusion locations and the detection area is used in accordance with the corresponding date and time.

6. The intruder detection system according to claim 5, wherein the storage unit is configured to accommodate a change to the date and time, and store the changed date and time in the detection table.

7. The intruder detection system according to claim 1, wherein the detection result outputted from the detection result output unit indicates that an intruder is present, and the detection result includes information on the intrusion location of the intruder.

8. The intruder detection system according to claim 1, wherein, when the intrusion is detected, an alarm is different in accordance with the detection result or the detection area.

9. The intruder detection system according to claim 1, wherein, when the intrusion is detected, at least one of a security camera and a light is operated in the corresponding intrusion location.

10. The intruder detection system according to claim 9, wherein at least one of the security camera and the light are configured to rotate and, when the intrusion is detected, at least one of the security camera and the light provided in the corresponding intrusion location is rotatably operated.

11. The intruder detection system according to claim 1, wherein, the output of the detection result is locked in accordance with an identification signal for identifying a person who is allowed to access a desired intrusion detection region.

* * * * *